Patented June 19, 1951

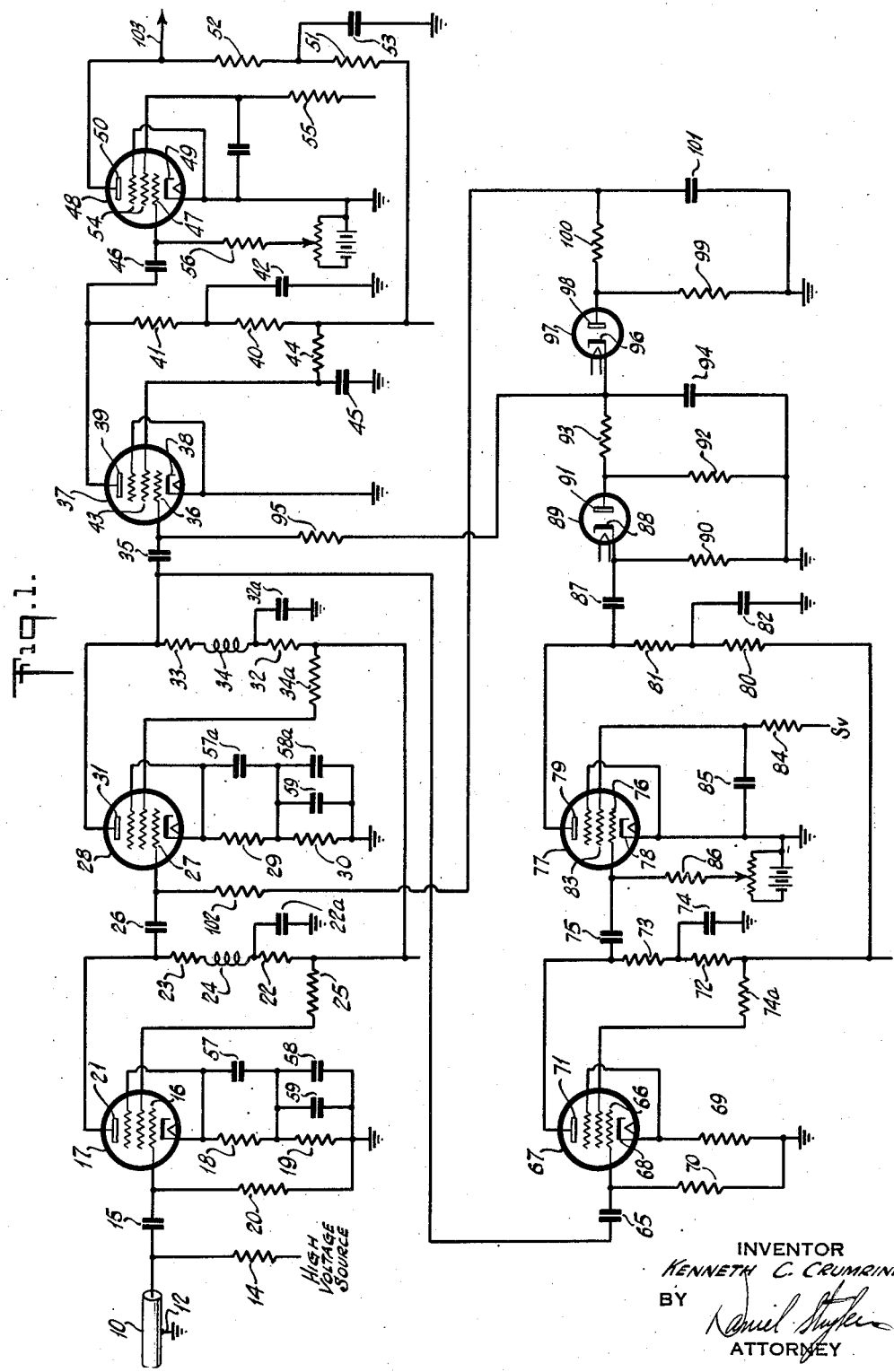

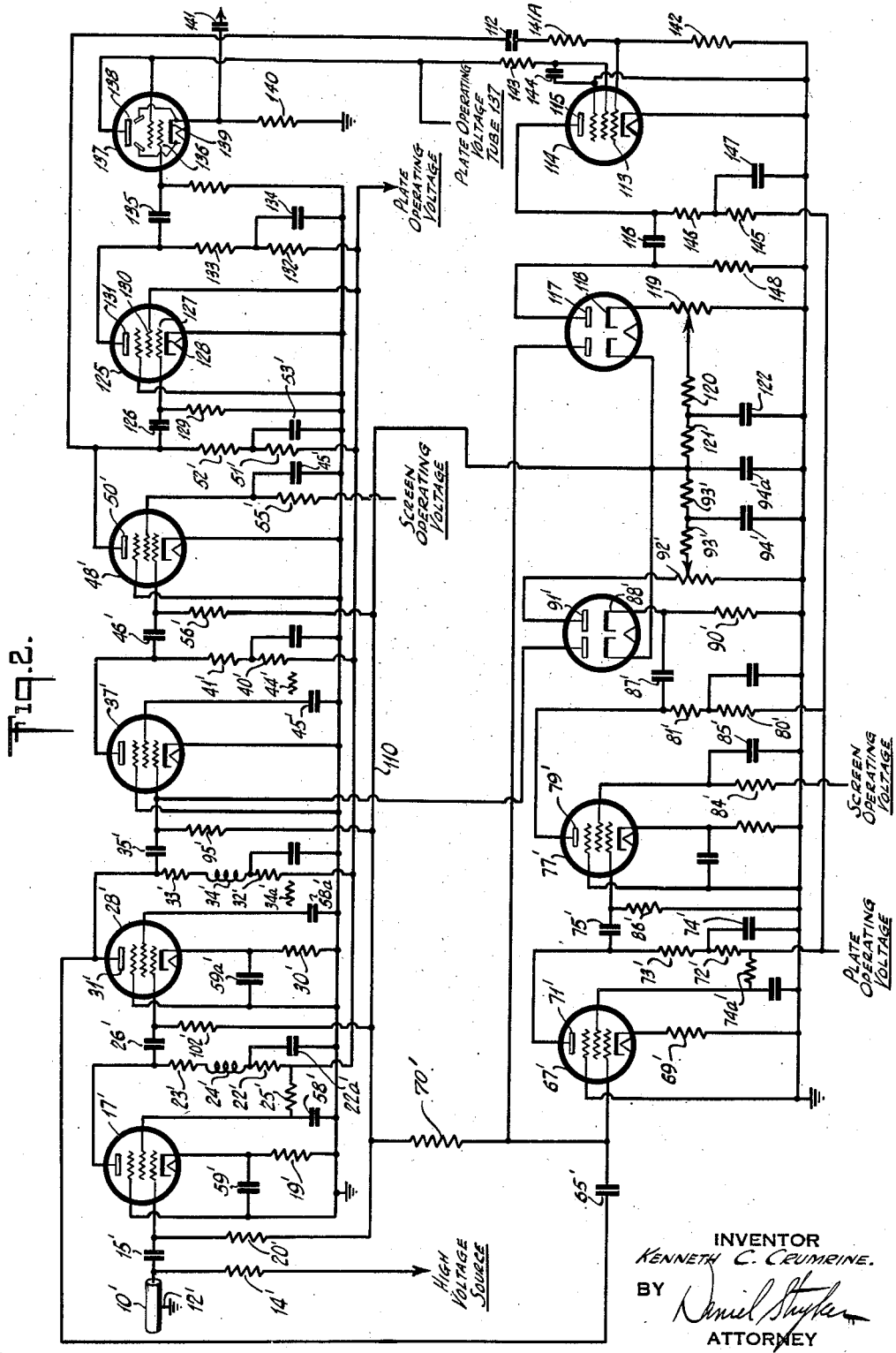

2,557,636

UNITED STATES PATENT OFFICE 2,557,636

AMPLIFYING AND PULSE SELECTING CIRCUIT FOR RADIATION DETECTORS

Kenneth C. Crumrine, Tulsa, Okla., assignor to The Texas Company, New York, N. Y., a corporation of Delaware Application June 12, 1946, Serial No. 676,165

2 Claims. (Cl. 179—171)

The present invention relates to the operation of radiation detectors of the counter type and more particularly to methods and circuits for operation and control of such radiation detectors in the range in which they operate as proportional counters. The present invention is particularly intended for use in applications in which the detector is subjected to radiations of varying types and in which it is desired to select and indicate or record responses due to one type of radiation while eliminating those due to other types. Thus the invention is particularly applicable in what is known as neutron well-logging, in which it is desired to indicate or record the intensity of the scattered slow neutron radiation from structural formations bombarded by neutrons while eliminating or suppressing responses due to gamma rays coming directly from the radiation source or being scattered by the surrounding material, and to natural or induced gamma rays from the formations.

In connection with the present invention the detectors employed are of the counter or pulse-producing type and are operated in a range of applied voltages in which the size of the pulses varies with the initial ionization of the radiation or particle producing the pulse; i. e., in what is known as the "proportional counter" range. When slow neutrons are to be detected, the counter is sensitized so that the slow neutrons or a certain proportion thereof passing the field in which the counter is located will produce ionizing particles. Such sensitization is effected, for example, by coating the cathode elements of the detector with boron or lithium compounds, for example boron carbide, or by employing within the detector a vapor or gaseous filling which includes boron fluoride. When so sensitized, bombardment with slow neutrons will cause the production of alpha particles from the active isotope of the boron or lithium in compounds used for sensitizing the detector.

The detector is at the same time sensitive to gamma rays, bombardment with which causes emission of beta particles. Thus the detector produces pulses as a result of the impingement of both slow neutrons and gamma rays. A detector suitable for use in accordance with the present invention is shown in my co-pending application, Ser. No. 511,516, filed November 24, 1943, now U. S. Letters Patent No. 2,462,471, granted February 22, 1949.

It is frequently desired to separately indicate or record the responses or pulses due to the slow neutrons while eliminating the effect of those due to the gamma rays. Since the alpha particles resulting from slow neutron bombardment produce a greater initial ionization than the beta particles resulting from gamma ray bombardment, the pulses resulting from the action of the slow neutrons are of greater size or amplitude than those resulting from the action of gamma rays when the detector is operated in the proportional counter range; that is, under applied voltages below those of the operating range at which the size of the pulses becomes substantially independent of the initial ionization of the particles producing them.

In many applications in which the detector will be employed, the number of counts or responses due to gamma rays will very greatly exceed those due to slow neutrons. This is true in neutron well-logging above referred to, in which the detector is affected by gamma rays coming directly from the radiation source and scattered by the surrounding material and also by gamma rays resulting from natural radioactivity of the formations surrounding the well being logged and by induced gamma rays resulting from the bombardment of the formations by particles from the radioactive source which is used as the neutron source. By the method employed in the circuit of the present invention, the responses of the detector to penetrating radiations which it encounters are amplified for indication or recording in such a way that those due to gamma rays are substantially entirely suppressed or eliminated.

A further difficulty in the use of radiation detectors in the proportional counter range, particularly in applications such as well-logging, is that they are sensitive to changes in voltage and current applied across the electrodes of the detector, such changes in voltage and current resulting both in changes in pulse size or amplitude and in number of pulses produced in a field of given intensity of radiation. Such variations in voltage and current may result from changes at the current source, or from changes in operation of the detector through changes in environmental conditions, such as temperature, humidity, and the like. Thus, changes in temperature, which may be quite substantial in well-logging, may result in variations of the number of counts produced through changes in the operation of the detector itself and also through changes in the operation of the parts associated with it, such as changes in the emissivity of the cathodes of the vacuum electronic tubes used in the circuits associated with a detector. In accordance with the present invention, the operation of the detector is stabilized at a predetermined level irrespective of such changes in applied voltage or in the conditions affecting the detector and its associated parts.

In accordance with the present invention, the detector is associated with an amplifier channel or circuit in which, preferably after some amplification, the pulses of lesser amplitude due to gamma rays are eliminated by control of the bias voltage on the control grid of one of the tubes constituting the amplifying circuit. In order to stabilize the operation of the circuit independently of changes in voltage or other conditions which may affect the size and number of pulses as above indicated, the bias voltage applied to effect the elimination of the pulses due to gamma rays is varied as a function of the total number or of the number and size of the counts or pulses produced, such variation constituting an effective control since a great preponderance of the total number of counts or pulses are due to the gamma rays. It has also been found advantageous to vary the gain through part or all of the portion of the amplifying channel preceding the tube at which the gamma ray pulses are eliminated, this being suitably effected by control of the bias on the amplifying tubes in a manner generally similar to an automatic voltage control operating as a voltage compressor. The sensitivity for neutrons alone may be improved, but with some sacrifice in stability under varying temperatures, by a further modification of the amplifying circuit in which a voltage is derived from some part of the amplifying channel after the pulses due to the gamma rays are eliminated, the value of which voltage being a function of the remaining pulses due to the action of slow neutrons, and this derived voltage is used to vary the bias on the tube at which the elimination of the pulses due to gamma rays is effected, this control being in a direction inverse to that of the control exercised by the total of the pulses as above referred to; i. e., as a voltage expander. Circuits embodying the present invention are illustrated in the accompanying drawing in which Fig. 1 is a diagrammatic drawing of a circuit embodying the present invention, and Fig. 2 is a diagrammatic drawing of another circuit embodying the present invention.

Referring more particularly to the circuit of Fig. 1, the numeral 10 designates the detector, which may suitably be of the type described in my Patent No. 2,462,471, above referred to, and which is sensitized so that it responds to slow neutron bombardment. It is shown schematically and as is apparent, may be a single or a multiple detector. The cathode is shown as being grounded through the conductor 12. The necessary high voltage for operation of the detector is supplied from a suitable high voltage source through the resistor 14.

As has been pointed out above, the detector is operated with the applied high voltage across its electrodes of an order such that it acts as a proportional counter. For a detector of the type illustrated in my aforementioned Patent No. 2,462,471 this voltage may be in the order of 600 to 1200 volts. Gamma rays, which cause the emission of beta particles within the detector, result in pulses of smaller magnitude; and slow neutrons, which cause the emission of alpha particles from the sensitizing material used in the detector, cause the production of pulses of larger magnitude.

The pulses which are produced within the detector appear at the anode as negative pulses and are transmitted through coupling condenser 15 to the control grid 16 of the high vacuum electronic tube 17. This is a tube suitable for amplification of a very wide range of frequencies and having low capacitances. For example, it may be a type 1852 tube and is preferably operated in the linear amplifying range. Its cathode is connected to ground through resistors 18 and 19 and the control grid is also connected to ground through the biasing resistor 20. The necessary operating voltage from a suitable source, say at 250 volts, is impressed upon the plate 21 of tube 17, through the resistors 22 and 23 and the compensating inductance 24. The screen grid voltage may be derived from the plate voltage source through the screen grid resistor 25 and the suppressor grid may be maintained at cathode voltage.

In the tube 17, the pulses are amplified and inverted, and the positive pulses produced in the plate circuit of this tube are transmitted through a coupling condenser 26 to the control grid 27 of a second amplifying tube 28, which may be similar in type to tube 17. The cathode of tube 28 is connected to ground through resistors 29 and 30.

The control grid 27 of tube 28 may be biased at a point close to cutoff in any suitable manner. In the circuit illustrated, the bias on the control grid of this tube is controlled to change the gain of the tube as an inverse function of the total number and size of the pulses derived from the detector. While this is preferred, it is not essential.

The voltage for plate 31 of tube 28 may be derived from the same voltage source as that for the plate of tube 17 and may be impressed upon the plate through the resistors 32 and 33 and the inductance 34. As in the case of tube 17, the screen operating voltage may be derived from the same plate voltage source through the resistor 34a and the suppressor grid may be maintained at cathode voltage.

The negative pulses on the plate 31 of tube 28 are transmitted through the condenser 35 to the control grid 36 of tube 37, which is preferably a tube having remote cutoff characteristics, such as the type 1853 tube. The bias on the control grid 36 of this tube is automatically controlled by a negative voltage which is a function of the total number and size of the amplified pulses; as hereinafter described, in order to decrease the gain of this tube as the number and size of the pulses increase and to increase the gain of the tube as the number and size of the pulses decrease.

The cathode 38 of tube 37 is grounded and its suppressor grid is maintained at cathode voltage. The plate 39 of this tube derives its operating voltage from a suitable source through resistors 40 and 41, condenser 42 being provided for a bypass to ground. Screen grid 43 of tube 37 derives its operating voltage from the same source through the resistor 44. The screen is by-passed to ground by the condenser 45.

Positive pulses are derived at the plate 39, which pulses are fully compensated for the variations in the operation of the detector and of the amplifying system due to the various factors hereinbefore referred to, such as fluctuations in voltage and current applied to the detector and to the various tubes, fluctuations in temperature, and the like. These positive pulses are transmitted through condenser 46 to the control grid 47 of the tube 48, which may also suitably be a type 1852 tube. The cathode 49 of this tube may suitably be grounded and its suppressor grid may be maintained at cathode voltage. The operating voltage for the plate 50 of tube 48 is impressed upon it from a suitable source through the resistors 51 and 52, the condenser 53 providing a by-pass to ground. A suitable voltage is impressed upon the screen grid 54 of tube 48 from a voltage source through the resistor 55.

The tube 48 is biased beyond cutoff to an extent sufficient to substantially eliminate pulses of smaller amplitude due to the action of gamma rays within the detector. To accomplish this, the desired biasing voltage is impressed upon the control grid 47 of this tube from a suitable source of negative voltage through the resistor 56.

The variations in counting rate of the detector due to difference in formations may often be but a small proportion of total count and hence a high degree of accuracy is required. The variations in counting rate due to supply current variations may be of a like odor and hence it is important that their effects be eliminated.

In order to compensate for variations in size and number of pulses due to fluctuations in supply current and in operating conditions, the bias on control grid of tube 37, and preferably also the bias on the control grid of tube 28, are controlled by means of a circuit generally similar to an automatic volume control circuit operating as a volume compressor circuit, as will now be described.

Pulses from a suitable point in the amplifying circuit preceding the tube 48, for example, those derived from the plate 31 of tube 28, are further amplified and rectified and from them is derived a negative voltage which has direct current characteristics and is a function of the size or of the size and number of the amplified pulses. This negative voltage is then used to bias the tube 37 and the same negative voltage or a negative voltage derived from it may be used to bias the tube 28.

In the embodiment shown in Fig. 1, negative pulses from the plate 31 of tube 28 are transmitted through condenser 65 to control grid 66 of tube 67, which may suitably be a type 1852 tube. The cathode 68 of this tube is connected to ground through the resistor 69. The control grid is likewise connected to ground through the biasing resistor 70. The suppressor grid is maintained at cathode voltage. The necessary operating voltage of plate 71 of this tube is derived from a suitable source through the resistors 72 and 73, a by-pass to ground being provided by condenser 74.

The pulses derived from the plate 71 of tube 67 are further amplified and inverted by the action of tube 77, which may likewise be a tube of the 1852 type. The cathode 78 of tube 77 is grounded and its suppressor grid is maintained at cathode voltage. The necessary voltage for the plate 79 of the tube 77 is impressed upon it from a suitable source of voltage through resistors 80 and 81, a by-pass to ground being provided by condenser 82. The necessary voltage for the operation of screen grid 83 of tube 77 is derived from a suitable source of intermediate positive voltage through the resistor 84. A by-pass to ground is provided by the condenser 85.

As will be apparent, negative pulses are developed at the plate of tube 77. If desired, the tubes 67 and 77 may be operated to largely equalize the size of the pulses delivered by the latter. This the tube 77 may be operated with its control grid biased slightly beyond cutoff, the amplification of the pulses by the preceding tubes being such that the amplified pulses, for the most part, drive the grid voltage completely across the characteristic curve, thus delivering substantially equalized pulses of maximum amplitude. These negative pulses are now rectified to produce a negative voltage which is impressed upon a resistance-capacity net work to produce a negative voltage having D. C. chracteristics and which is a function of the number and size of the pulses. This latter voltage is impressed upon the control grid of tube 37 in order to control the gain in that tube. In order that this derived voltage may suitably control tube 37, a suitable time constant for the resistance-capacity net work may be in the order of $\frac{1}{10}$ to $\frac{1}{2}$ second.

In the embodiment illustrated, the negative pulses from plate 79 of tube 77 are transmitted through the condenser 87 to the cathode 88 of the diode rectifier tube or unit 89, which may be, for example, one section of a type 6H6 tube. The cathode 88 of the diode unit 89 is connected to ground through the cathode resistor 90. The plate 91 of the diode unit 89 is connected to ground through the resistor 92, across which pulses of negative voltage appear. The diode 89 operates to suppress the positive back-wave which is introduced by the coupling condenser 87. From the ungrounded side of the resistor 92, the pulses of negative polarity are impressed upon an integrating or resistance-capacity circuit made up of resistor 93 and the condenser 94, the characteristics of which are such as to give a sufficient smoothing effect due to the time constant hereinbefore set forth. The resulting integrated negative voltage having direct current characteristics, and which is a function of the size and number of the pulses transmitted to the diode unit 89, is impressed upon the control grid 36 of the tube 37 through the resistor 95 in order to effect the desired control of the gain or amplification in this tube.

As hereinbefore set forth it is preferred that the gain or amplification of the tube 28 should also be controlled in a similar manner. In order to accomplish this, in the circuit illustrated, the biasing voltage for the control grid 27 of tube 28 is derived from an integrated voltage resulting from the action of the tube 28. The negative integrated voltage derived from the action of the integrating circuit made up of the resistor 93 and the condenser 94 is impressed upon the cathode 96 of the second diode tube or unit 97, which is similar to the diode tube or unit 89 and which may likewise be a unit of a type 6H6 tube. The plate 98 of diode unit 97 is connected to ground through the resistor 99, across which a voltage is developed as a result of the action of the tube or unit 97. From the negative side of the resistor 99, the resulting negative voltage is impressed upon an integrating or resistance-capacity circuit similar to that used with tube or unit 89. This integrating circuit is made up of the resistor 100 and the condenser 101. The resulting integrated negative voltage having D. C. characteristics is impressed upon the control grid of tube 28 through resistor 102.

If desired, the lower end of grid resistor 102, like that of resistor 95, may be directly connected with the junction of resistor 93 and condenser 94. In such case the diode unit 97 and associated circuit can be omitted.

As a result of the operation of the circuit described, the amplified pulses derived from the plate 50 of the tube 48 constitute essentially only the pulses resulting from the action of slow neutrons in the detector, compensated with respect to variations in voltage and current at the source, temperature, and other environmental variations which may cause fluctuations in the number and size of the pulses formed in the detector. These amplified pulses from the tube 48 are transmitted through the conductor 103 to any suitable device (not shown) for counting, indicating or recording the pulses; for example, to further amplifying and integrating circuits connected with suitable recording circuits; to scaling circuits suitably connected to counting circuits, or the like.

In connection with the circuit illustrated in Fig. 1 of the drawings, heating circuits for various cathodes and cathode heaters have not been shown since such circuits are well-known and their showing would unnecessarily complicate the drawings. Although separate sources of voltage for supplying operating voltage to the plates of the various tubes have been shown for simplicity, it will be understood that a single source of high voltage for operation of these plates may be used. Similarly, where separate sources of positive voltage for the screen grids of various tubes and where separate sources of negative biasing voltage for the control grids of various tubes have been used, it will be understood that single sources of the proper voltages may be employed. It will be further understood that under circumstances in which the circuits employed are contained in a single casing or instrument, as in well-logging, the casing or wall of the instrument may be used as a ground or point of base potential where ground connection has been indicated in the drawing.

The following are illustrative constants of the various circuit elements employed in the specific embodiment of the circuit illustrated in Fig. 1.

The resistor 14 through which the high voltage was impressed upon the detector anode had a resistance of .1 megohm. The voltage impressed on the detector electrode was in the order of 600 to 1200 volts. The capacity of coupling condenser 15 was .0001 microfarad and that of each of the coupling condensers 26, 35 and 46 in the main amplifying circuit was .01 microfarad. As indicated above, tubes 17, 28 and 48 were type 1852 tubes and tube 37 a type 1853 tube. The high voltage source for supplying plate operating current to each of these tubes was at 250 volts.

In the circuits of tubes 17 and 28, in the connections between the voltage source and the plate, the resistances of resistors 31 and 32 were each 10,000 ohms; the inductances of coils 24 and 34 were each 30 millihenries; and the resistances of resistors 23 and 33 were each 25,000 ohms. The resistances of resistors 25 and 34a in the screen voltage supplied were each .15 megohm. The resistances of the cathode resistors 18 and 29 were each 200 ohms, and those of resistors 19 and 30 were each 750 ohms. In connection with these resistors, by-pass or filtering condensers are shown. Of these the capacities of condensers 57 and 57a were each .03 microfarad, and the capacities of condensers 58 and 58a were each 4 microfarads.

The resistance of biasing resistor 20 of control grid 17 was .25 megohm. The resistance 102 in the control circuit for biasing the control grid of tube 28 was also .25 megohm.

The capacities of condensers 22a and 32a, respectively, shunted across the resistors 22 and 32 to provide decoupling filters, were each .5 microfarad.

In the circuit of tube 37, the resistances of resistors 40 and 41 in the plate voltage supply line were respectively 30,000 and 12,500 ohms. The capacity of by-pass condenser 42 was .5 microfarad. The resistances of resistor 44 in the screen voltage supply line was .15 megohm and the capacity of condenser 45 was .5 microfarad. The resistance of resistor 95 in the circuit for biasing the control grid of this tube was .25 megohm.

In the circuit of the tube 48, the resistances of resistors 51 and 52 in the plate voltage supply line were respectively 30,000 and 5,500 ohms, and the capacity of condenser 53 was .5 microfarad. The screen voltage was derived from a suitable source of about 67 volts and the screen grid resistor 55 was .2 megohm. A variable source of negative voltage was used for impressing the desired bias on the control grid 47 of this tube through the resistor 56, which had a resistance of .2 megohm.

In the control circuit the capacity of coupling condenser 65 was 0.01 microfarad. In the circuit of tube 67 the resistance of bias resistor 70 was .25 megohm and that of cathode resistor 69 was 200 ohms. In the plate voltage supply line, the resistance of resistor 72 was 30,000 and that of resistor 73 was 10,000 ohms. The capacity of condenser 74 was .5 microfarad. The resistance of resistor 74a in the screen voltage supply line was .2 megohm.

In the circuit of tube 77, which was a type 1852 tube, the biasing voltage was impressed upon the control grid through the resistor 86 of .2 megohm. The resistor 84 in the screen voltage supply line had a resistance of .2 megohm and the condenser 85 a capacity of .5 microfarad. The screen voltage source for the screen grid of tube 77 was the same as for that of tube 48. The plate operating voltage was supplied to the plate 79 of tube 77 through resistor 80 of 30,000 ohms and the resistor 81 of 5,500 ohms. The capacity of condenser 82 was .5 microfarad.

In the circuit of the diode unit 89, the capacity of coupling condenser 87 was .001 microfarad and the resistance of cathode resistor 90 was .25 megohm. The resistance of resistor 92 was 1 megohm and in the resistance capacity circuit, the resistance of resistor 93 was .5 megohm, and the capacity of condenser 94 was .5 microfarad, giving a time constant or RC product of .25 second. In the circuit of diode unit 97 the resistance of resistor 99 was 2.5 megohms; that of resistor 100 was .5 megohm and the capacity of condenser 101 was .5 microfarad.

In Fig. 2 is shown a modified form of circuit, a portion of which is generally similar to that illustrated in Fig. 1, with certain modifications as hereinafter set forth; and in addition sensitivity for neutrons is improved by a further control of the amplifying circuits through the pulses resulting primarily from the action of neutrons which remain after the elimination of those due to the action of gamma rays.

In Fig. 2 the elements in that portion of the circuit which correspond to elements in the circuit of Fig. 1 are given corresponding numerals with a prime. Thus, in Fig. 2, 10' is the detector, and the amplifying tubes 17', 28', 37' and 48' correspond to the tubes 17, 28, 37 and 48, respectively, of Fig. 1 in characteristics and in operation. Except as noted below the component parts of the various circuits may be substantially the same as in the circuit of Fig. 1.

The same is true with respect to the circuits of amplifying tube 67' and 77' of Fig. 2 and of the diode unit including the cathode 88' and the plate 91', which correspond essentially to the similarly numbered parts without the primes in Fig. 1.

Thus in the operation of the circuit of Fig. 2, as in that of Fig. 1, negative pulses are derived from the action of the detector 10'. Amplified, negative pulses appear at the plate 31' of tube 28', these pulses having substantially the same distribution as to size as the original pulses from the detector. From the plate 31' of tube 28', the pulses are transmitted through the coupling condenser 65' to the portion of the circuit in which the integrated negative voltage having direct current characteristics is derived, which voltage is a function principally of the total number of pulses resulting from the action of the detector. As in Fig. 1, this voltage is used to control the operation of the main operating channel. This will be referred to hereinafter.

As in the circuit of Fig. 1, the amplified, negative pulses of plate 31' of tube 28' are also transmitted to the amplifying tube 37' having remote cutoff characteristics in which somewhat of a compressing effect upon the amplitude of the amplified pulses is secured, and amplified, positive pulses are transmitted from the plate circuit of tube 37' to the tube 48', which is biased beyond cutoff and by which the effects of the pulses due to gamma rays are substantially eliminated.

This portion of the circuit, as illustrated in Fig. 2, differs somewhat from that shown in Fig. 1, in that the negative direct current voltage derived from the total pulse action of the detector is employed not only to control the gain of the tube 37', but also to control the bias of the tube 48', which exercises the selective function, and to control the gain of all the tubes preceding tube 37' in the main amplifying channel.

Thus, the amplified pulses derived from the tube 28' are further amplified and preferably equalized by the action of the tubes 67' and 77', and the negative pulses from the latter are transmitted through the coupling condenser 87' to the diode unit made up of the cathode 88' and plate 91'. This diode unit may suitably be a portion of a 6H6 tube. The plate 91' of the diode unit is connected to ground through the resistor 92', and from a point on this resistor, the position of which may be varied, a negative voltage is impressed upon a resistance and capacity network made up of resistors 93' and capacities 94' and having characteristics such as to give the short time averaging as in the circuit of Fig. 1. An integrated negative voltage having direct current characteristics is thus secured, which is a function primarily of the number, or if desired, of the size and number of the total pulses transmitted to the diode unit. In the case of Fig. 2, this derived negative voltage is impressed not only upon the control grid of tube 37' to control its gain, but also, through the bus 119, upon the control grid of tube 48' to control its selective action and upon the control grids of each of the preceding tubes 17' and 28', so that the gain of all of these tubes is controlled inversely as a function of the number or of the size and number of the total pulses derived from the detector.

Since the negative control voltage derived as above described results from the integration of the total pulses from the detector, a small proportion of it is due to the pulses resulting from the action of neutrons. In order to correct this negative voltage so that it represents substantially only a function of the size and number of the pulses due to the action of gamma rays, additional means may be provided as illustrated in Fig. 2.

As pointed out above and in connection with Fig. 1, the action of the tube 48' is selective and substantially eliminates the effect of the pulses other than those due to neutron rays, so that the negative pulses which appear at the plate 50' of the tube 48' are substantially only those resulting from neutron action. These negative pulses are impressed through coupling condenser 112 upon the grid 113 of tube 114, which may be a tube similar in characteristics to tubes 17' and 28', such as a type 1852 tube. From the plate 115 of the tube 114 amplified, positive pulses are derived, which are transmitted through the condenser 116 to the plate 117 of a diode unit, the cathode 118 of which is connected to ground through a resistor 119. The diode unit may suitably be one of the diode units of a 6H6 tube. From a variable point on resistor 119, a positive voltage is taken off and transmitted to the integrating resistance-capacity network made up of resistors 120 and 121 and condenser 122. In this circuit the constants are such that a time averaging is provided which is of the same order as is the time constant provided by the integrating circuit made up of the elements 93' and 94'. As a result of the action of this integrating circuit on the positive voltage derived from the cathode 118 of the diode unit an integrated positive voltage having direct current characteristics is derived, which voltage is a function of the size and number of the pulses essentially due to neutrons only and this positive voltage is applied as a corrective factor to the negative voltage, derived as above described, as an integrated function of the total pulses in the action of the detector. Thus, to a substantial extent, the inclusion of the pulses due to neutron action in the latter is compensated for. This correction is thus applied in connection with the selective action of the tube 48' and, in the form illustrated, in controlling the gain in the preceding tubes of the amplifying channel. If desired, however, this correcting or controlled voltage may be applied only to the grid of the selector tube 48' and to only certain or none of the preceding amplifier tubes. It will be noted that the corrective or control voltage is not applied to the control of the amplifying tubes in the channel following selective tube 48'.

Of these subsequent tubes, tube 125 further amplifies the pulses from the plate 50' of tube 48', due essentially only to the action of neutron particles. These pulses, which are negative, are transmitted through the coupling condenser 126 to the grid 127 of tube 125. The cathode 128 of tube 125 is connected to ground and the bias voltage is applied to grid 127 through the resistor 129. The screen grid 130 is connected to a suitable source of voltage and the plate 131 is supplied with its operating voltage through the resistors 132 and 133. The tube 125 may be operated to give linear amplification, or, preferably, to equalize as well as amplify the pulses, which are now substantially only those due to neutron action.

The amplified and substantially equalized pulses on the plate 121 of tube 125 are impressed through coupling condenser 135 upon the grid 136 of tube 137, which is preferably a power tube, for example, a beam power tube such as a type 50L6 tube. The plate 138 of the tube 137 has impressed upon it a suitable operating voltage. The cathode 139 of tube 137 is connected to ground through resistor 140 and positive pulses are taken off from the cathode 139 of the tube 138 at a point between the cathode and the resistor 140, these positive, amplified pulses being then transmitted through the coupling and blocking condenser 141, for example, to a cable for transmission to the surface in the case of well-logging, or to suitable recording or indicating mechanism, after further amplification or after integration, if desired.

In the specific embodiment of the circuit illustrated in Fig. 2, in respect of those circuit elements which correspond to circuit elements of the embodiment of Fig. 1, the applied voltages and the constants of the varied circuit elements may suitably be the same as for the circuit elements of Fig. 1. Some, however, may be modified as follows:

The resistance of cathode resistor 19' of tube 17' may be about 1,000 ohms, as may also that of the cathode resistor 30' of tube 28'. The capacities of coupling condensers 26', 35' and 46' may be about 0.001 microfarad. The capacities of condensers 59' and 59a' may be 0.03 microfarad, and the capacities of screen grid condensers 58' and 58a' may be 0.5 microfarad. The resistance of screen grid resistor 44' of tube 37' may be 75,000 ohms. The resistance of plate resistor 41' of tube 37' may be 7,500 ohms, and that of resistor 40' the same as of its counterpart 40 in Fig. 1.

The resistance of cathode resistor 69' of tube 67' may be 500 ohms and that of screen grid resistor 74a' may be 0.1 megohm. The resistances of plate resistors 72' and 73' may be respectively 20,000 ohms and 12,500 ohms.

In the circuit of tube 77', the resistance of resistor 86' may be 50,000 ohms, that of the cathode resistor 250 ohms, and that of the screen grid resistor 84' may be 0.1 megohm; and that of the plate circuit resistor 81' may be 10,000 ohms. The capacity of the condenser between the leads to the suppressor grid and the cathode of this tube may be in the order of 0.03 microfarad.

In the first integrating network, the resistances of each of the resistors 93' may be in the order of 0.1 megohm and the capacity of the condenser 94a' may be 1 microfarad; that of 94' being 0.5 microfarad.

Referring to the circuit elements in the circuit of tube 125, the capacity of coupling condenser 126 may be 0.0001 microfarad; the resistance of the grid resistor 129, 0.25 megohm, and the resistances of plate resistors 132 and 133 may be 10,000 and 30,000 ohms, respectively. The capacity of condenser 134 may be in the order of 0.5 microfarad. In the circuit of the power tube 137, the capacity of the coupling condenser 135 may be 0.001 microfarad; the resistance of the grid resistor may be 0.2 megohm and that of the resistor 140 may be 100 ohms. The source of voltage for the plate 138 of tube 137 may suitably be about 100 volts for a 50L6 type tube.

In the circuit of tube 114, the capacity of coupling condenser 112 may be in the order of 0.001 microfarad and the resistances of resistors 141 and 142 may be respectively 0.5 and 0.25 megohm. The resistance of resistor 143 may be in the order of 0.1 megohm and the capacity of condenser 144 may be in the order of 0.5 microfarad. The resistances of plate resistors 145 and 146 may be respectively 10,000 and 25,000 ohms, and the capacity of the by-pass condenser 147 may be in the order of 0.5 microfarad.

In the circuit of the diode unit made up of plate 117 and cathode 118, the capacity of coupling of condenser 116 may be in the order of 0.005 microfarad. The resistance of the plate resistor 148 may be in the order of 0.2 megohm and that of the cathode resistor 119 may be in the order of 0.5 megohm.

In the second voltage integrating circuit, the capacity of the condenser 122 may be in the order of 0.5 microfarad and the resistances of each of the resistors 120 and 121 may be in the order of 0.1 megohm.

In the circuit of Fig. 2, it will be noted that the second half or diode unit of the duplex tube containing the diode unit made up of plate 91' and cathode 88' is used as a back wave eliminator in connection with the grid circuit of tube 37'. The second half or diode unit of the duplex tube, of which the plate 117 and cathode 118 constitute one diode unit, is similarly used as a back wave eliminator in connection with the grid circuit of tube 67'. Thus, the function of the left-hand portions of the diodes containing plates 91' and 117 is to provide a virtual short circuit across the grid of the tubes 37' and 67' respectively so as to prevent the back wave from being applied to the grids and, therefore, proceeding through the amplifier.

In the circuits of Fig. 2, the heating circuits for the cathode heaters or filaments of the various tubes, being well known in the art, are not shown.

In connection with the operation of neutron counting systems in radioactivity well-logging, it is to be noted that the significant changes in counting rate may be but a low percentage of the total number of neutron pulses counted. It is therefore very important that the accuracy of counting be of a high order and that changes resulting from such extraneous factors as fluctuations in the supply current, changes in voltage, changes in cathode emission, or the like, be automatically compensated for, as they are in the circuits of the present invention. That the proportion of pulses due to neutron action relative to those due to gamma rays in the output of the detector itself is small, is an additional factor which makes necessary great care in securing an adequate control. By the circuits of the present invention, variations in other factors than those due to variations in the strata are adequately compensated for and at the same time the pulses due to the neutrons are selected and those due to gamma rays substantially eliminated from the pulses finally delivered by the system.

I claim:

1. In an amplifying and selecting circuit for use with a radiation detector delivering pulses of smaller size and pulses of larger size resulting from different types of radiation, an amplifying channel for receiving and amplifying all said pulses and delivering amplified, positive pulses, an electron discharge tube having its grid coupled to receive said amplified, positive pulses and biased to select therefrom substantially only pulses of larger size, a second amplifying channel for receiving and amplifying the selected pulses of larger size, and means for controlling the action of said selecting tube comprising means for taking amplified, negative pulses from a point in the amplifying channel preceding said selecting tube, amplifying means for further amplifying the pulses thus taken and for producing amplified, negative pulses therefrom, means for deriving from said amplified, negative pulses a unidirectional integrated negative voltage which is a function of the number and size of said pulses and varies therewith, means for taking amplified pulses from the said second amplifying channel and deriving from said amplified larger pulses a unidirectional integrated positive voltage which is a function of the number and amplitude of said larger pulses and varies therewith, means for combining the said integrated negative and positive derived voltages, and means for impressing the resulting combined unidirectional voltage upon the grid of said selector tube to control and stabilize the action thereof.

2. A circuit as described in claim 1, wherein the said combined unidirectional voltage is impressed upon at least a part of the amplifying channel preceding said selector tube to vary and control the gain therein.

KENNETH C. CRUMRINE.

REFERENCES CITED

The following references are of record in the file of this patent:

UNITED STATES PATENTS

| Number | Name | Date |
| --- | --- | --- |
| 2,019,637 | Shelleng | Nov. 5, 1935 |
| 2,240,593 | Wilson | May 6, 1941 |
| 2,240,600 | Applegarth | May 6, 1941 |
| 2,293,528 | Barco | Aug. 18, 1942 |
| 2,324,781 | Kolb | July 20, 1943 |
| 2,413,423 | Wilson | Dec. 31, 1946 |
| 2,428,011 | Chatterjea | Sept. 30, 1947 |

FOREIGN PATENTS

| Number | Country | Date |
| --- | --- | --- |
| 520,709 | Great Britain | May 1, 1940 |